(12) United States Patent
Maeda et al.

(10) Patent No.: US 6,635,606 B2
(45) Date of Patent: Oct. 21, 2003

(54) RELEASE AGENTS FOR DIE CASTING

(75) Inventors: Yasuyuki Maeda, Fukui (JP); Dai Masuda, Fukui (JP)

(73) Assignee: Nicca Chemical Co., Ltd., Fukui (JP)

( * ) Notice: Subject to any disclaimer, the term of this patent is extended or adjusted under 35 U.S.C. 154(b) by 0 days.

(21) Appl. No.: 09/774,625

(22) Filed: Feb. 1, 2001

(65) Prior Publication Data

US 2001/0031708 A1 Oct. 18, 2001

(30) Foreign Application Priority Data

Mar. 17, 2000 (JP) ........................................ 2000-075787

(51) Int. Cl.$^7$ .......................... C10M 173/02; B22C 3/00
(52) U.S. Cl. ..................................... 508/208; 106/38.22
(58) Field of Search ........................ 508/208; 106/38.22

(56) References Cited

U.S. PATENT DOCUMENTS

| | | | | |
|---|---|---|---|---|
| 3,847,622 A | * | 11/1974 | Brandl et al. | |
| 5,425,804 A | * | 6/1995 | Shinohara et al. | |
| 5,507,969 A | * | 4/1996 | Shinohara et al. | |
| 5,900,456 A | | 5/1999 | Hashiuchi et al. | |
| 5,919,290 A | * | 7/1999 | Ishikawa et al. | |
| 6,352,582 B1 | * | 3/2002 | Brown | |

FOREIGN PATENT DOCUMENTS

| | | |
|---|---|---|
| GB | 797971 | 7/1958 |
| JP | 4-084643 | 3/1992 |

* cited by examiner

*Primary Examiner*—Jerry D. Johnson
(74) *Attorney, Agent, or Firm*—Oblon, Spivak, McClelland, Maier & Neustadt, P.C.

(57) ABSTRACT

The present invention provides a release agent for die casting, which exhibits a superior lubricating property, namely release property not only in a low-temperature die but also in a high-temperature die.

A release agent for die casting is an aqueous emulsion comprising 5–50% by weight of a silicone mixture containing dimethyl silicone and an alkyl-modified silicone, 0.5–5% by weight of a surfactant, and water.

7 Claims, No Drawings

RELEASE AGENTS FOR DIE CASTING

FIELD OF THE INVENTION

This invention relates to a release agent for die casting with a superior lubricating property which may be used for die casting of aluminum alloys, magnesium alloys, zinc alloys and the like.

BACKGROUND OF THE INVENTION

Silicone oils have been used as a representative component for a water-soluble release agent for die casting. Particularly, alkyl-modified silicones such as α-olefin-modified silicone, α-methylstyrene-modified silicone, phenyl-modified silicone and carboxy-modified silicone have been widely used in actual working, because the alkyl-modified silicones may provide a superior release property due to the lubricating property of the alkyl group and a hard release film formed on die by gelling on heating.

Dimethyl silicone, which is also one of silicone oils, is a highly stable compound and therefore has heat resistance, whereby a solid film is not formed on die of die casting. As a result, it has drawbacks of poor release property and lubricating property. Moreover, it may significantly impair painting property of cast products. Consequently, it has never been recognized as a release agent for die casting, nor has it been applied for actual working.

Although alkyl-modified silicones could exhibit a superior release property in a lower temperature range, they tend to be decomposed and vaporized at an elevated die temperature of above 300° C. so that a sufficient release property could not be maintained. Thus, there has been a demand for improvement of their release property at an elevated temperature.

SUMMARY OF THE INVENTION

An object of this invention is to provide a release agent for die casting which may exhibit a superior lubricating property or a release property not only in a low-temperature die but also in a high-temperature die.

DETAILED DESCRIPTION OF THE INVENTION

The present inventors have paid the attention to dimethyl silicone, which has never attracted interest because of its difficulty in use, and brought to completion of the present invention based on the finding that the above object may be achieved by using the said silicone together with alkyl-modified silicones widely used in the prior art.

More specifically, this invention is directed to a release agent for die casting, which is an aqueous emulsion comprising 5–50% by weight of a silicone mixture containing dimethyl silicone and an alkyl-modified silicone, 0.5–5% by weight of a surfactant, and water.

The invention is also directed to the said release agent characterized in that a mixing ratio of said dimethyl silicone to said alkyl-modified silicone is 5:1–1:5.

The invention is further directed to the said release agent characterized in that dimethyl silicone has a kinematic viscosity of 200–5000 cSt at 25° C.

Moreover, the invention is directed to the said release agent characterized in that the said alkyl-modified silicone has an alkyl chain of 6–18 carbon atoms, a modifying rate of 50–100%, and a kinematic viscosity of 200–5000 cSt at 25° C.

This invention will be illustrated in detail hereinafter.

(1) Silicone Mixture

The silicone to be used in the invention is a mixture of dimethyl silicone with an alkyl-modified silicone. A preferable mixing ratio of dimethyl silicone: alkyl-modified silicone is 5:1–1:5, with 4:1–2:3 being particularly preferable. If an amount of the dimethyl silicone is beyond the ratio, a sufficient lubricating property cannot be provided. If an amount of the dimethyl silicone is less than the ratio, a heat resistance of the release agent tends to lower.

The dimethyl silicone preferably has a kinematic viscosity of 200–5000 cSt (centistokes; $cSt=mm^2/s$) at 25° C., with 200–1000 cSt being particularly preferable. If less than 200 cSt, a sufficient adhesion property to die cannot be obtained. If beyond 5000 cSt, it may cause excess sedimentation to die.

The alkyl-modified silicone preferably has an alkyl chain of 6–18 carbon atoms, preferably 8–14 carbon atoms. It preferably has a modifying rate of 50–100%. Further, it preferably has a kinematic viscosity of 100–3000 cSt at 25° C.

The alkyl-modified silicone may be usually prepared by addition of α-olefin to methylhydrogenpolysiloxane using a platinum catalyst.

In this context, the said modifying rate means to be a numerical value, $y/(x+y) \times 100$ (%), as calculated in the modified silicone, $—[—(CH_3)_2SiO—]_x—[—(R)(CH_3)SiO—]_y—$.

(2) Surfactant

The surfactant is an emulsifying agent, which may stably emulsify the dimethyl silicone or the alkyl-modified silicone, and it may be a nonionic surfactant such as a polyoxy-alkylene alkyl ether or an esterified product thereof. The surfactant may be used at 5–20% in relation to the component to be emulsified so that the release agent should comprise 0.5–5% by weight of the surfactant. Furthermore, an anionic surfactant such as an alkyl sulfate and a Tamol-type surfactant or a cationic surfactant such as a tetraalkylammonium salt may be optionally used together. The resulting mixture may be formed into an oil-in-water emulsion using an emulsifying apparatus such as a homogenizer, a colloid mill and a planetary mixer.

(3) Other Components

Other components may be incorporated into the above-mentioned mixture, e.g., mineral oils, oils and fats, synthetic ester oils, oiling agents and synthetic waxes in such an amount as not to impair the effect of the invention.

(4) Preparation of Release Agent

The release agent according to the invention may be prepared by pre-mixing a mixture of dimethyl silicone and an alkyl-modified silicone with a surfactant and water, followed by treating the premix with an emulsifying apparatus such as a homogenizer, a colloid mill and a planetary mixer, and further adding water.

When the release agent of the invention is to be applied, it may preferably be diluted about 10–200-fold and then spray-coated.

This invention will be illustrated in greater detail on the basis of the following examples, but this invention is not to be limited thereto.

Preparation of Release Agent

The components used were "SH200" (100–10000 cSt) as dimethyl silicone, "SF8416" as alkyl-modified silicone (both manufactured by Dow Corning Toray Silicone Co., Ltd.) and an addition product of a straight chain higher alcohol of 12 carbon atoms with 9 moles of ethylene oxide (HLB 13.3) as surfactant. After 20 parts of the silicone mixture, 5 parts of the surfactant and 10 parts of water were pre-mixed, the premix was treated with a colloid mill and then water was added so as to make up to a total of 100 parts.

Evaluation Method

The samples of the release agents prepared as described above were evaluated according to the following test methods.

The results are shown in Tables 1 and 2.

(1) Test for Lubricating Property (Release Property)

The lubricating property of the release agent film was tested according to the ring compression method used for evaluation of lubricating agents for plastic working, and evaluated with the friction coefficient thus obtained. The die had a dimension of a diameter 100 mm×a thickness 10 mm. The material was SKD61, and two dies were used for the test. The die was heated to about 200° C., and 10 ml of the sample 10-fold diluted with water was spray-coated onto one side of the die to form a uniform film. The aluminum ring test piece (material of A5052, outer diameter 54 mm×inner diameter 27 mm×height 18 mm) preheated to about 500° C. was interposed between the film surfaces of the two dies and then compressed at a compression rate of 50% by a 100-ton oil press. The friction coefficient was calculated from the compression rate and change rate of inner diameter of the test piece after compressed.

(2) Test for Adhesion Property

The release agent was 50-fold diluted with water, and 10 ml of the diluted agent was sprayed by an automatic sprayer onto a steel plate heated to a prescribed temperature in order to observe the adhesion property. The steel plate had a diameter 100 mm×a thickness 10 mm and a material of SKD61. Plate temperatures were 200° C., 300° C. and 400° C. A spraying air pressure was 4 kg/cm².

The adhesion property was evaluated according to the following standards:

A: Adhered thick and uniformly
B: Adhered thin and uniformly
C: Little adhered (3) Test for Sedimentation Property The release agent was 20-fold diluted with water, and the diluted agent was continuously sprayed 50 times in 6 ml portions onto a steel plate heated to 200° C. from 15 cm above. Then weight changes of the steel plate were determined to evaluate the sedimentation property. The steel plate had a dimension of 120×120×1.6 mm and its material was SPCC.

The sedimentation property was evaluated according to the following standards:

A: Little sediment observed
B: Small amount of sediment observed
C: Large amount of sediment observed

TABLE 1

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|---|---|---|
| Dimethyl silicone 1000 cSt | 18 | 17 | 16 | 12 | 10 | 8 | 4 | 3 | 2 | 20 | 0 |
| Alkyl-modified silicone | 2 | 3 | 4 | 8 | 10 | 12 | 16 | 17 | 18 | 0 | 20 |
| Surfactant | 5 | 5 | 5 | 5 | 5 | 5 | 5 | 5 | 5 | 5 | 5 |
| Water | 75 | 75 | 75 | 75 | 75 | 75 | 75 | 75 | 75 | 75 | 75 |
| Total | 100 | 100 | 100 | 100 | 100 | 100 | 100 | 100 | 100 | 100 | 100 |
| Lubricating property μ Low temp. 200° C. | 0.14 | 0.09 | 0.06 | 0.07 | 0.07 | 0.06 | 0.06 | 0.06 | 0.07 | 0.16 | 0.06 |
| Lubricating property μ Low temp. 300° C. | 0.14 | 0.10 | 0.09 | 0.09 | 0.09 | 0.10 | 0.11 | 0.12 | 0.15 | 0.16 | 0.19 |
| Lubricating property μ High temp. 400° C. | 0.16 | 0.12 | 0.11 | 0.12 | 0.12 | 0.12 | 0.15 | 0.17 | 0.21 | 0.16 | 0.28 |

TABLE 2

|  | Ex. 10 | Ex. 11 | Ex. 12 | Ex. 5 | Ex. 13 | Ex. 14 |
|---|---|---|---|---|---|---|
| Dimethyl silicone 100 cSt | 10 |  |  |  |  |  |
| Dimethyl silicone 200 cSt |  | 10 |  |  |  |  |
| Dimethyl silicone 500 cSt |  |  | 10 |  |  |  |
| Dimethyl silicone 1000 cSt |  |  |  | 10 |  |  |
| Dimethyl silicone 5000 cSt |  |  |  |  | 10 |  |
| Dimethyl silicone 10000 cSt |  |  |  |  |  | 10 |
| Alkyl-modified silicone | 10 | 10 | 10 | 10 | 10 | 10 |
| Surfactant | 5 | 5 | 5 | 5 | 5 | 5 |
| Water | 75 | 75 | 75 | 75 | 75 | 75 |
| Total | 100 | 100 | 100 | 100 | 100 | 100 |
| Adhesion property to die |  |  |  |  |  |  |
| 200° C. | A | A | A | A | A | A |
| 300° C. | B | B | B | B | B | B |
| 400° C. | C | B | B | B | B | B |
| Sedimentation property 200° C. | A | A | A | B | B | C |

Industrial Applicability

The release agent of the invention shows a favorable lubricating property not only in a low-temperature die but also in a high-temperature die and also has a superior release property. Moreover, a superior adhesion property to die is observed even after only one spray-coating. The release agent of the invention brings only a little sedimentation which tends to occur during continuous die casting. Consequently, this invention significantly improves working efficiency of die casting, and contributes to the quality improvement of die-cast products.

What is claimed is:

1. A release agent for die casting comprising an aqueous emulsion comprising 5–50% by weight of a silicone mixture containing dimethyl silicone and an alkyl-modified silicone, wherein said alkyl-modified silicone has an alkyl chain of 6–18 carbon atoms, 0.5–5% by weight of a surfactant, and water.

2. The release agent as claimed in claim 1, wherein a mixing ration of said dimethyl silicone to said alkyl-modified silicone is 5:1–1:5.

3. The release agent as claimed in claim 1, wherein said dimethyl silicone has a kinematic viscosity of 200–5000 cSt at 25° C.

4. The release agent as claimed in claim 1, wherein said alkyl-modified silicone has a modifying rate of 50–100%, and a kinematic viscosity of 100–3000 cSt at 25° C.

5. The release agent as claimed in claim 4, wherein said alkyl-modified silicone has an alkyl chain of 8–14 carbon atoms.

6. The release agent as claimed in claim 1, wherein a mixing ratio of said dimethyl silicone to said alkyl-modified silicone is 4:1–2:3.

7. The release agent as claimed in claim 1, wherein said dimethyl silicone has a kinematic viscosity of 200–1000 cSt at 25° C.

\* \* \* \* \*